Aug. 21, 1956 R. J. COLLINS ET AL 2,759,861
PROCESS OF MAKING PHOTOCONDUCTIVE COMPOUNDS
Filed Sept. 22, 1954

INVENTORS: R. J. COLLINS
F. W. REYNOLDS
G. R. STILWELL
BY Hugh S. Wertz
ATTORNEY United States Patent Office 2,759,861

Patented Aug. 21, 1956

2,759,861

PROCESS OF MAKING PHOTOCONDUCTIVE COMPOUNDS

Robert J. Collins, Green Village, Frederick W. Reynolds, Ridgewood, and George R. Stilwell, Plainfield, N. J., assignors to Bell Telephone Laboratories, Incorporated, New York, N. Y., a corporation of New York Application September 22, 1954, Serial No. 457,742

23 Claims. (Cl. 148—1.5)

This relates to a process for making semiconductor materials and particularly for making semiconductor compounds of group III and group V elements and to articles of manufacture formed by such a process.

In the periodic table of elements boron (B), aluminum (Al), gallium (Ga) and indium (In) belong to the class of group III elements, and nitrogen (N), phosphorous (P), arsenic (As) and antimony (Sb) belong to the group V class of elements. It is known that compounds formed of many of the elements of group III and group V have the properties of semiconductors and such semiconductor compounds have been made. Heretofore, however, the compounds produced have not shown significant photoconductive characteristics which, from theoretical considerations, appear to be predictable. It is believed that this lack of success is due in fact to the methods used in forming the compounds and that by utilizing a new process semiconductor material having significant photoconductive characteristics can be produced. Such a result would be most desirable inasmuch as these compounds with photoconductive characteristics show great promise for use in infrared detectors, television pickup tubes and as semiconductors.

An object of this invention is to produce compounds of group III and group V elements having significant photoconductive characteristics.

An additional object of this invention is to provide a new process for forming semiconductor compounds of group III and group V elements.

Not all of the compounds that can be made from group III and group V elements are of the same crystalline structure. While any difference in crystalline structure does not alter the herein disclosed process for making the compounds, the quantitative photoconductive effect can be expected to differ with crystalline structure. In particular, the compounds that can be made from the elements Al, Ga, and In of group III, and P, As, and Sb of group V, that is, the compounds AlP, AlAs, AlSb, GaP, GaAs, GaSb, InP, InAs, InSb, have zinc blende crystalline structure and have electrical properties similar in many respects to those of the known semiconductor materials germanium and silicon. A compound formed of the lighter elements (B, N) forms a Wurzite crystalline structure and this compound is also a semiconductor.

A specific object of this invention is to produce semiconductor compounds of group III and group V elements having zinc blende and Wurzite crystalline structure which exhibit significant photoconductive properties.

A further specific object is to provide a new process for forming semiconductor compounds of group III and group V elements having zinc blende and Wurzite crystalline structures.

In a semiconductor of the group III–V compound it is believed necessary that the compound be formed in strict stoichiometric ratio and that the compound be substantially free of impurities. These ends are in part achieved when the elements of the compound are deposited on a substrate by a carefully controlled evaporation process which evenly distributes the elements of the compounds in stoichiometric relation through the area and depth of the deposited film.

Tests have shown that such a deposited film does not show significant photoconductive effects until it has been annealed for a sufficient period of time to achieve complete homogeneous compound distribution. It is not certain as to what takes place during the annealing process but it is believed that prior to the heat treatment the evaporated film is little more than a mixture of the elements of the compound and during heat treatment the group III element atoms and group V element atoms combine to form the compound.

In accordance with the invention, the process for making semiconductor compounds of group III and group V elements comprises the steps of depositing the elements in compound proportions onto a substrate by evaporation in a high vacuum and annealing the evaporated film to form a homogeneous compound. The evaporation process is controlled so that the vapor of the elements settles on the substrate in stoichiometric ratio and substantially free of impurities. The annealing process is preferred in a vacuum at a high temperature and for a period sufficient to form the compound and produce a homogeneous polycrystalline film.

The evaporation step may be performed by "flash" evaporation of a grown crystal of group III–V compound or simultaneous evaporation of the individual elements of the compound. However, the choice of evaporation procedures is dependent not on the availabilty of materials alone but also on the physical nature of the film desired as an end product. The individual evaporation process is particularly desirable in the case where it is desired to form a P–N junction of semiconductor material made of group III and group V elements. From the nature of the evaporation equipment used in the simultaneous method as described in detail hereinafter, it is clear that evaporation control may be extended to build a film having, for example, a layer of group III element, a layer of group III–V compound and a layer of group V element. This, of course, produces a P–N junction not attainable by evaporation of the compound itself.

In one specific example of the process in accordance with the invention, a group III–V compound of zinc blende crystalline structure is formed by individually and simultaneously evaporating the respective elements in a high vacuum onto a warm substrate and the compound so formed is then annealed at a temperature in a range above the lowest melting point of the compound.

An important result of forming the compounds by this process is that significant photoconductive characteristics became observable.

The invention, its objects, and its advantages will be better understood by referring to the following description and drawings forming a part thereof, wherein.

Figure 1:
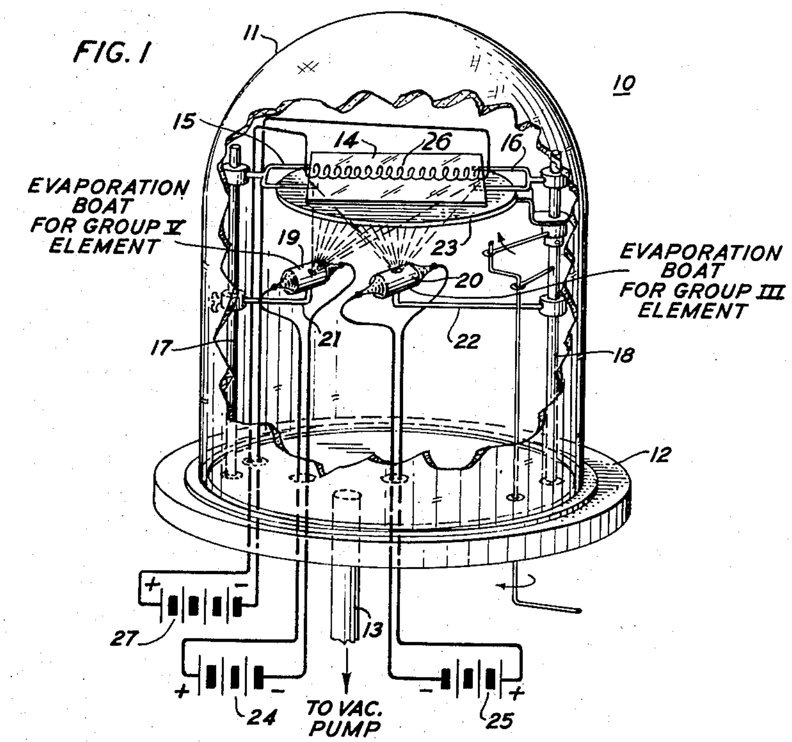
Fig. 1 is a drawing in perspective showing the apparatus used in the process of the invention.

With specific reference to Fig. 1, there is shown therein high vacuum evaporation apparatus 10 including a bell jar 11 mounted on a bell jar base plate 12 and connected to associated evacuating apparatus through passage 13.

In the bell jar a substrate 14 is supported, with its lower surface exposed, by arms 15 and 16 connected respectively to mounting poles 17 and 18. Evaporation boats 19 and 20 are supported below and in close proximity to the substrate by arms 21 and 22 connected respectively to mounting poles 17 and 18. A movable shutter 23 is connected to the mounting pole 18 and adjacent to the lower surface of the substrate to provide a means for isolating the substrate from the vapors given off by the evaporation boats. The boats are made of a conductive material, for example, by way of illustration, tantalum, and current is supplied independently to the boats 19 and 20 by sources 24 and 25, respectively. A heater coil 26, which may be, for example, of Nichrome wire, is mounted adjacent to the upper surface of the substrate and supplied with current from a source 27.

As the interest in this particular process is to form the group III–V compound in stoichiometric ratio, it is desired that the molecular deposition rate of the two simultaneously evaporated elements on the substrate be equal. One way of assuring equal deposition is to control the mass of the elements evaporated per unit time so that molecular deposition is equal. The evaporated mass M of an element is a function of the temperature of the evaporation boat and the evaporation area. As the vaporization temperature of the group III and group V elements will differ, it can be seen that equal molecular deposition can be accomplished by evaporating the elements from identical closed boats having an aperture of a given area in one side thereof as shown in Fig. 1 and controlling the temperature of each boat by means of sources 24 and 25. This control method is but one of many that could be used, it being obvious that the temperatures and area of the apertures in both boats could take on any number of selected values and still evaporate the two elements in a manner to cause deposition in stoichiometric ratio.

In the evaporation process the geometric locations of the evaporation boats relative to the substrate are also important to the rate of deposition of the elements. Assuming a constant molecular evaporation rate, the deposition rate in any given area of the substrate will be dependent upon the distance of the boat from that area of the substrate and the angle subtended by that area relative to the axis of the cone of vapor emitted from the aperture in the boat. In the simultaneous evaporation system described, assuming equal evaporation rates, the compound can be formed in stoichiometric ratio over a large area of the substrate by placing the two boats in immediate proximity to one another and at equal distances from the substrate, sufficient so that for all practical purposes the vapors of both elements, when viewed from the substrate, appear to have a common source.

Gradated mixtures of the elements on the substrate, which can include the compound, can be produced by controlling the relative periods of operation of the two boats or by spacing the boats and changing the angle of the axis of their respective cones relative to the substrate. Using such arrangements it is clear that P–N junctions of the group III and group V elements can be formed. For example, with the boats containing respectively a group III element and a group V element arranged so that the vapors from each appear to have a common source, it is possible by use of shutters on the boats to deposit first the group III element on the substrate for a given period and of a given thickness, then operate both boats simultaneously to form a group III–V compound and then shutter the group III element boat to permit deposition of only the group V element. In this fashion a P–N semiconductor junction might be formed.

Figure 2:
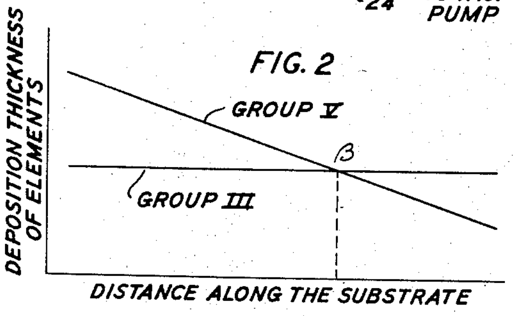
Fig. 2 is a diagram showing the deposition thickness of each element onto the substrate by means of the apparatus of Fig. 1.

Another geometric arrangement for forming junctions is that shown in Fig. 1 which calls for spacing the boats. As shown boat 20 is centered with respect to the substrate and will deposit an even film of the element contained therein which as shown in Fig. 1 is of the group III series. Boat 19 is located so that the axis of its vapor cone subtends an acute angle to the center of the substrate so that the quantity of the element in boat 19, which as shown in Fig. 1 is of the group V series, will be gradated over the area of the substrate. That is, the quantity of group V element deposited on the substrate at a point nearest to the aperture in boat 19 will be greatest and will decrease to the point most remote from the aperture in boat. As shown in Fig. 2, the deposition of the two elements will be controlled so that at some point B the elements are deposited in stoichiometric ratio. The film on one side of the group III–V compound represented by point B will be predominantly P-type and on the other side predominantly N-type. Hence a P–N junction is formed as tests tend to verify.

Figure 3:
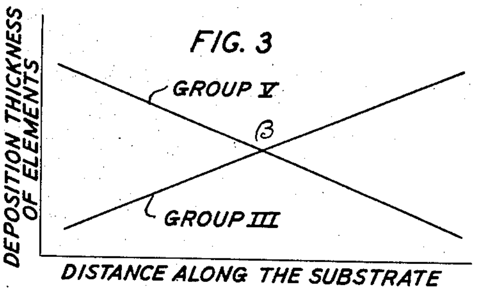
Fig. 3 is a diagram showing an alternative deposition thickness of each element on the substrate in a modified arrangement of the apparatus shown in Fig. 1.

The P–N junction area B can be more sharply defined by moving boat 20 to a position so that the axis of its vapor cone relative to the substrate supplements that angle of boat 19. With this geometric arrangement, element deposition is as shown in Fig. 3 and the demarcation between the junction area, represented by B, the predominant P-type area and the predominant N-type area is better defined. It is obvious that the above given assignment of group III and group V elements to particular evaporation boats is arbitrary and that either of the elements may be assigned to a particular boat.

The process as practiced in accordance with the invention and as shown in Fig. 1 calls for initially covering the lower surface of the substrate 14 with a shutter 23. Current is then passed through the evaporation boats 19 and 20 thereby heating the boats and the respective group III and group V elements therein. The shutter is maintained in place until the evaporation rates of the boats have reached a constant state and the shutter is then removed for a given period. Obviously if "flash" evaporation of the compound is employed, only one boat containing the compound need be used.

To insure that only the elements desired are deposited on the substrate, the evaporation is done in a high vacuum and the substrate is heated to prevent the condensation of any undesirable gases or vapors thereon. In practice it was found most practical to evaporate in a vacuum of the order of $5 \times 10^{-6}$ mm. of Hg and the substrate was warmed to a temperature in a range from 70° to 125° C. Under these conditions it was found that the lower limit of the deposition rate is determined by the number of residual gas atoms in the deposition area which strike the substrate. The rate of the number of evaporated atoms to the number of residual gas atoms striking the substrate per second should be one hundred to one.

During the evaporation period the vapors of the two elements are deposited on the substrate as above described. It is believed that in the area where the elements are deposited in stoichiometric ratio, only a portion of the atoms of the two elements combine to form a compound, the remainder of the atoms are combined in compound by annealing.

The annealing process is conducted at a sufficiently high temperature and for a sufficient period to produce the best photoconductive characteristics in the compound. It has been found that the temperature should be in a range between a temperature that corresponds to that of the lowest melting point of the two elements and a temperature that corresponds to that of the melting point of the compound, and though successful annealing has been performed in periods of two and four hours, the optimum time is from six to ten hours. Investigation has shown that the annealing induces crystal growth and produces a homogeneous polycrystalline film.

Figure 4:
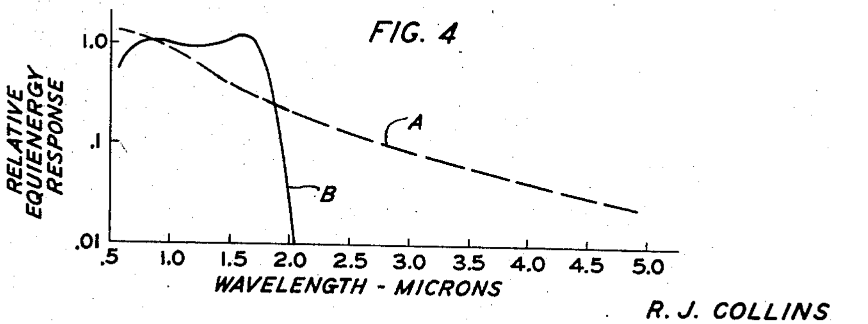
Fig. 4 shows the photoconductive characteristics of some of the group III–V compounds made in accordance with the principles of the invention.

In one example in practice of simultaneous evaporation, indium, a group III element, and antimony, a group V element, were evaporated using the apparatus and geometric arrangement shown in Fig. 1 onto a microscope slide to form the compound indium antimonide. The indium and antimony were placed in individual closed evaporation boats made of tantalum. The aperture in each boat was made to be 3.5 millimeters in diameter and the boat containing the indium was centered directly beneath the substrate and approximately 5 centimeters therefrom. The boat containing the antimony was positioned approximately 4.5 centimeters from the indium boat in the direction of the longitudinal axis of the substrate and about 5 centimeters below the level of the substrate. Evaporation of the indium took place at temperatures in the range of 1000° C. to 1300° C. and evaporation of the antimony took place at temperatures in the range of 650° to 800° C. at a deposition rate of 50 A. per second for 20 seconds. Annealing was performed at a temperature in the range of 175° C. to 250° C. for a period of six hours. Both the evaporation and annealing processes were carried out in a vacuum of substantially $5\times10^{-6}$ mm. of Hg. The photoconductive properties of the compound indium antimonide so formed are shown in Fig. 4 by curve A. Also in Fig. 4, curve B illustrates the photoconductive properties of gallium antimonide produced in accordance with the principles of the invention. Both curves in Fig. 4 have been normalized to unity at one micron.

It is understood that the above-described arrangements are merely illustrative of the principles of the invention and many other arrangements may be devised by those skilled in the art without departing from the spirit or scope of the invention.

What is claimed is:

1. A process for making photoconductive layers of indium antimonide comprising the steps of simultaneously evaporating indium at a temperature of about 1100° C. and antimony at a temperature of about 725° C. in a vacuum of at least $5\times10^{-6}$ millimeters of mercury onto a surface at a rate in the order of 50 angstroms per second, said surface being at a temperature in the range from 75° C. to 150° C., and annealing said compound so formed in a vacuum of at least $5\times10^{-6}$ millimeters of mercury at substantially 200° C. for a period of substantially six hours.

2. A process for making photoconductive layers of indium antimonide comprising the steps of simultaneously evaporating indium at a temperature in the range of 1000° C. to 1300° C. and antimony at a temperature in the range of 650° C. to 800° C. in a high vacuum onto a surface at a rate in the order of 50 angstroms per second, said surface being at a temperature of substantially 100° C., and annealing said compound so formed in a high vacuum at substantially 200° C. for a period of substantially six hours.

3. A process for making photoconductive indium antimonide comprising the steps of simultaneously evaporating indium at a temperature in the range of 1000° C. to 1300° C. and antimony at a temperature in the range of 650° C. to 800° C. in a high vacuum onto a surface at a rate in the order of 50 angstroms per second, said surface being at a temperature of substantially 100° C., and annealing said compound in a high vacuum to form a homogeneous compound.

4. A process for making photoconductive layers of indium antimonide comprising the steps of evaporating indium and antimony in stoichiometric ratio in a high vacuum onto a surface, said surface being at a temperature in a range of 75° C. to 150° C. and annealing said compound so formed at substantially 200° C. for a period of substantially six hours.

5. A process for making photoconductive indium antimonide comprising the steps of simultaneously evaporating indium and antimony at equal evaporating rates onto a surface in a vacuum of at least $5\times10^{-6}$ millimeters of mercury at a rate in the order of magnitude of 50 angstroms per second and annealing said compound so formed in a vacuum of at least $5\times10^{-6}$ millimeters of mercury at substantially 200° C. for a period of substantially six hours.

6. A process for making photoconductive layers of indium antimonide comprising the steps of simultaneously evaporating indium and antimony at equal vapor pressures onto a surface in a vacuum chamber at the rate of substantially 100 indium and antimony atoms to one residual chamber gas atom, and annealing said compound so formed in a high vacuum at a temperature below the melting point of the compound to form a substantially homogeneous compound.

7. A process for making a group III–V compound comprising the steps of evaporating a group III element selected from the group consisting of boron, aluminum, gallium and indium and a group V element selected from the group consisting of nitrogen, phosphorus, arsenic and antimony in stoichiometric ratio onto a surface in a high vacuum, and annealing said compound so formed in a high vacuum at a temperature below the melting point of said compound to make said compound homogeneous.

8. A process for making a photoconductive group III–V compound comprising the steps of simultaneously evaporating a group III element selected from the group consisting of boron, aluminum, gallium and indium and a group V element selected from the group consisting of nitrogen, phosphorus, arsenic and antimony onto a surface in stoichiometric ratio in a high vacuum and annealing said compound so formed in a high vacuum to form a substantially homogeneous compound.

9. A process for making a photoconductive group III–V compound comprising the steps of simultaneously evaporating a group III element selected from the group consisting of boron, aluminum, gallium and indium and a group V element selected from the group consisting of nitrogen, phosphorus, arsenic and antimony at equal molecular evaporation rates onto a surface in a high vacuum, annealing said compound so formed in a high vacuum to form a homogeneous compound.

10. A process for making a photoconductive group III–V compound of zinc blende structure comprising the steps of evaporating indium and antimony in stoichiometric ratio onto a surface in a high vacuum, and annealing said compound so formed in a high vacuum at a temperature below the melting point of said compound to make said compound homogeneous.

11. A process for making a photoconductive group III–V compound of zinc blende structure, comprising the steps of simultaneously evaporating indium and antimony onto a surface in stoichiometric ratio in a high vacuum, annealing said compound so formed in a high vacuum to form substantially homogeneous compound.

12. A process for making a photoconductive group III–V compound of zinc blende structure, comprising the steps of simultaneously evaporating indium and antimony at equal evaporation rates onto a surface in a high vacuum, annealing said compound so formed in a high vacuum to form a homogeneous compound.

13. A process for making a P–N semiconductor junction of a group III element selected from the group consisting of boron, aluminum, gallium and indium, and a group V element selected from the group consisting of nitrogen, phosphorus, arsenic and antimony in a high vacuum comprising the step of evaporating a layer of group III element onto a surface, the step of simultaneously evaporating a group III element and group V element at equal molecular evaporation rates onto said group III layer to form a layer of group III–V compound, the step of evaporating a layer of group V element onto said compound layer, and the step of annealing said composite layers to form a homogeneous compound in said compound layer.

14. A process for making a P–N semiconductor junction of a group III element selected from the group consisting of boron, aluminum, gallium and indium, and a group V element selected from the group consisting of nitrogen, phosphorus, arsenic and antimony in a high vacuum comprising the step of evaporating a layer of group III element onto a surface, the step of simultaneously evaporating a group III element and a group V element onto said group III layer to form a layer of group III and group V elements mixed in stoichiometric ratio, the step of evaporating a layer of group V element onto said mixture layer, and the step of annealing said composite layers to form a homogeneous compound in said mixture layer.

15. A process for making a P–N semiconductor junction of indium and antimony in a high vacuum comprising the step of evaporating a layer of indium onto a surface, the step of simultaneously evaporating indium and antimony at equal evaporation rates onto said indium layer, to form a layer of indium antimonide, the step of evaporating a layer of antimony onto said indium antimonide layer, and the step of annealing said composite layers to form a homogeneous compound in said indium antimonide layer.

16. A process for making a P–N semiconductor junction of a group III element selected from the group consisting of boron, aluminum, gallium and indium, and a group V element selected from the group consisting of nitrogen, phosphorus, arsenic and antimony comprising the steps of simultaneously evaporating said elements, depositing said evaporated elements onto a substrate, said elements being deposited in separate gradated thickness patterns over the area of said substrate to form a compound in stoichiometric ratio in one portion thereof, and annealing said deposited layer of elements to form a homogeneous compound in said stoichiometric compound portion.

17. A process for making a P–N semiconductor junction of indium and antimony comprising the steps of simultaneously evaporating said elements, depositing said evaporated elements onto a substrate, one said element being deposited in a gradated thickness over the area of said substrate to form the compound indium antimonide in stoichiometric ratio in one portion thereof, and annealing said deposited layer of elements to form a homogeneous compound in said stoichiometric compound portion.

18. Indium antimonide having photoconductive properties formed by a process comprising the steps of simultaneously evaporating indium and antimony at equal vapor pressures onto a surface in a vacuum, said elements being deposited onto said surface at a rate of substantially 100 indium and antimony atoms to one unevacuated residual gas atom, and annealing said deposited evaporate in a high vacuum at a temperature below the melting point of the compound.

19. A compound having significant photoconductive properties formed of one element of a first group consisting of boron, aluminum, gallium and indium, and one element of a second group consisting of nitrogen, phosphorus, arsenic and antimony, by a process comprising the steps of simultaneously evaporating the element of said first group and the element of said second group at equal molecular evaporation rates onto a surface in a high vacuum and annealing said deposited evaporate at a temperature above the lowest melting point of the two elements and below the melting point of the compound, for a period of substantially six hours.

20. A process for making a photoconductive group III–V compound of zinc blende structure, comprising the steps of simultaneously evaporating the elements gallium and antimony onto a surface in a high vacuum, said elements being thereby deposited on said surface in stoichiometric ratio, and annealing the deposited evaporate in a high vacuum to form a substantially homogeneous compound.

21. A process for making a photoconductive group III–V compound of zinc blende structure, comprising the steps of simultaneously evaporating the elements aluminum and antimony onto a surface in stoichiometric ratio in a high vacuum, and annealing the resulting deposited film in a high vacuum to form a substantially homogeneous compound.

22. A process for making a photoconductive group III–V compound of zinc blende structure, comprising the steps of simultaneously evaporating the elements indium and arsenic onto a surface in stoichiometric ratio in a high vacuum, and annealing the resulting deposited evaporate in a high vacuum to form a substantially homogeneous compound.

23. A process for making a photoconductive group III–V compound of zinc blende structure, comprising the steps of simultaneously evaporating the elements gallium and arsenic onto a surface in stoichiometric ratio in a high vacuum, and annealing the resulting deposited material in a high vacuum to form a substantially homogeneous compound.

References Cited in the file of this patent

UNITED STATES PATENTS

| | | |
|---|---|---|
| 2,175,016 | Brunke | Oct. 3, 1939 |
| 2,561,411 | Pfann | July 24, 1951 |
| 2,671,739 | Lander | Mar. 9, 1954 |